Sept. 28, 1943.   A. KAZISKA   2,330,363
METHOD OF MAKING GLASS BANKS
Original Filed Dec. 14, 1938

Inventor
ANTHONY KAZISKA

By Olaw E. Bee
Attorney

Patented Sept. 28, 1943

2,330,363

UNITED STATES PATENT OFFICE 2,330,363

METHOD OF MAKING GLASS BANKS

Anthony Kaziska, Port Allegany, Pa., assignor to Pittsburgh Corning Corporation, Allegheny County, Pa., a corporation of Pennsylvania Original application December 14, 1938, Serial No. 245,638. Divided and this application May 25, 1940, Serial No. 337,225

3 Claims. (Cl. 49—82)

The present invention relates to methods of making articles of glass particularly adapted for the reception of coins and involves a division of my application, Serial No. 245,638, filed December 14, 1938.

The primary object of the invention is the provision of a process wherein a hollow container may be fabricated from glass in such manner that a regular opening is formed therein through which coins or paper money may be inserted.

Other objects and advantages of the invention will become more apparent from the following detailed description of a preferred embodiment thereof.

I am aware that many types of receptacles for money have been proposed and used in the prior art. An attractive bank creates a considerable inducement to save money. The presence of a bank readily available at all times apparently acts as an attractive lure and loose change can be placed therein without hardship.

In order to further the desire to save money it is only natural that these small home banks be so constructed that the gradual accumulation of wealth may be observed. Accordingly ordinary clay or metal banks were not entirely satisfactory and there resulted numerous forms of glass receptacles.

It is well known, however, that glass is rather fragile and the ordinary blown or molded containers do not possess sufficient strength to enable them to serve the desired purpose. Other forms of glass receptacles in which sections of glass were cemented together were also weak. At the same time, the manufacture of sectional glass containers was rather expensive and the product could not be sold at a reasonable price.

The present invention contemplates the manufacture of a glass bank wherein rectangular cup-shaped sections are fused or welded together and as a part of this operation a slot or opening is provided as a means of ingress into the center of the rectangular hollow bank. Since the formation of the sections and the completed article is accomplished simply and easily the manufacturing costs are very low. Also because of the shape of the finished bank sufficient strength is retained thereby to withstand hard usage.

Figure 1:
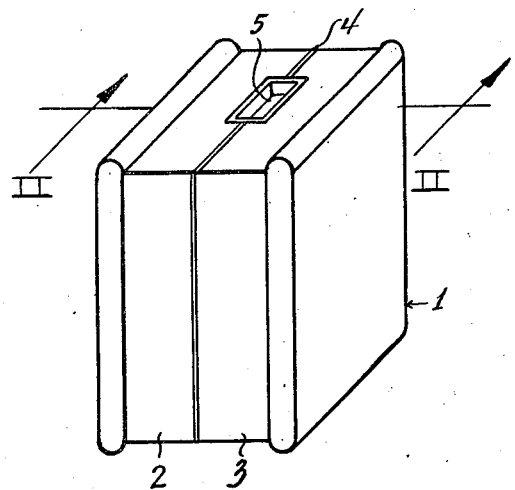
Figure 2:
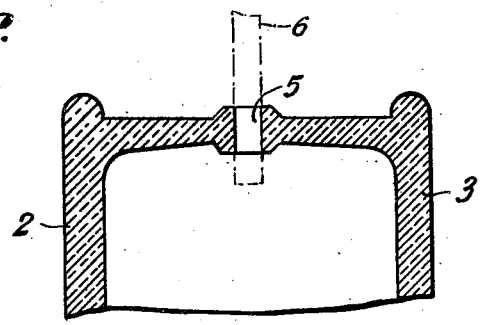

In the accompanying drawing illustrating a preferred embodiment of the invention, Fig. 1 is an isometric view of the completed bank, and Fig. 2 is a fragmentary vertical sectional view taken substantially along the line II—II of Fig. 1.

Referring to the drawing, a bank 1 comprises two rectangular cup-shaped sections 2 and 3 fused together at their peripheries to form a raised rib-like seam, as indicated at 4. Along edges forming the joint between the sections 2 and 3, an opening 5 is formed, the opening being pressed into the sections as they are fused or welded together, that is, the sections are at glass-softening temperature when brought together.

The process of manufacturing the bank as contemplated by my invention is comparatively simple. The sections 2 and 3 are formed in suitable molds and while the glass is still sufficiently fluid to permit fusion the sections are brought together and pressure is applied thereto until the weld is formed. At the time the two sections are joined, however, a small strip of metal 6 is interposed at a point along the line of juncture, in order that the subsequent application of pressure will not form a complete weld entirely around the periphery of the bank. The metallic strip may be of any desired width and thickness and its presence during the pressing operation causes the formation of the slot 5 in the walls of the rectangular sections 2 and 3. As clearly shown in Fig. 2, the seam 4 projects to form lips about the opening 5 on both the outside and inside wall surfaces of the sections 2 and 3. The metallic strip, which is non-fusible at the glass fusing temperature, is then removed, the fused sections freed from the pressing mold and the resulting bank is finally subjected to a controlled cooling or annealing to insure the greatest possible strength therein.

If it is desired, the faces of the two sections 2 and 3 may be provided with any suitable decoration either by forming a raised design in the mold or by a subsequent sand-blasting or other operation after the brick has been fabricated.

It will be obvious that various modifications in the size and shape of the elements and their manner of assembly may be resorted to without departing from the spirit of the invention or the scope of the appended claims.

I claim:

1. A method of making a hollow glass bank which comprises aligning in opposed relation two complemental cupped sections of glass heated to fusing temperature, bringing the opposed complemental rims of the sections together to fuse them into an integral unit and under sufficient pressure to form a raised junction seam between said sections, and forming a coin-receiving slot at the junction seam between the sections during the step of fusing them together and in such manner that the raised seam forms projecting lips about the slot.

2. A method of making a hollow coin-receiving bank which comprises bringing together two complemental cupped sections of glass heated to fusing temperature, pressing the complemental rims of the sections together sufficiently to fuse them while maintaining an opening-forming member between the sections at one location along the complemental rims thereof to form a coin-receiving slot, and subsequently removing the opening-forming member.

3. A method of making a glass bank which comprises aligning two heated cupped sections of glass in opposed rim-to-rim relation, pressing the heated opposed rims of the sections together under influence of sufficient heat and pressure to weld them into an integral unit, interposing a member between the section rims during the pressing action to form a coin-receiving slot at the junction of the welded rims, and subsequently withdrawing said member from the formed slot.

ANTHONY KAZISKA.